United States Patent [19]

Gerrans et al.

[11] Patent Number: 5,414,407
[45] Date of Patent: May 9, 1995

[54] TURN SIGNAL MONITOR CIRCUIT

[75] Inventors: A. Wilbur Gerrans, Marysville; Galen N. Cameron, Snohomish, both of Wash.

[73] Assignee: Turn Signal, Eden Prairie, Minn.

[21] Appl. No.: 59,778

[22] Filed: May 10, 1993

[51] Int. Cl.6 .............................................. B60Q 1/34
[52] U.S. Cl. ...................................... 340/475; 340/457; 340/477
[58] Field of Search ............... 340/457, 475, 776, 477; 307/141.1

[56] References Cited

U.S. PATENT DOCUMENTS

| 2,308,097 | 1/1943 | Murray, Jr. | 177/339 |
|---|---|---|---|
| 3,110,011 | 11/1963 | Burson, Jr. | 340/56 |
| 3,113,241 | 12/1963 | Yonushka | 315/200 |
| 3,308,428 | 3/1967 | Grontkowski | 340/477 |
| 3,562,799 | 2/1971 | Creager et al. | 340/56 |
| 3,806,868 | 4/1974 | Portman | 340/457 |
| 3,955,185 | 5/1976 | Nishimura | 340/324 |
| 4,058,797 | 11/1977 | Sekiguchi et al. | 340/56 |
| 4,125,827 | 11/1978 | Roudebush, Jr. | 340/73 |
| 4,128,770 | 12/1978 | Okazaki | 307/10 |
| 4,302,748 | 11/1981 | Gant | 340/67 |
| 4,306,218 | 12/1981 | Leconte et al. | 340/66 |
| 4,358,751 | 11/1982 | Roudebush, Jr. | 340/73 |
| 4,660,020 | 4/1987 | Miyamaru et al. | 340/134 |
| 4,791,401 | 12/1988 | Heidman, Jr. | 340/71 |
| 4,792,785 | 12/1988 | Yukio et al. | 340/73 |
| 4,907,844 | 3/1991 | White | 340/457 |

Primary Examiner—John K. Peng
Assistant Examiner—Benjamin C. Lee
Attorney, Agent, or Firm—Kinney & Lange

[57] ABSTRACT

An indicating circuit provides an indication that a turn signal in a vehicle is activated. A timer receives an activation signal representative of the turn signal. The timer provides a reminder output signal based on the activation signal. The timer provides the reminder output signal during reminder periods which are spaced by delay time periods. The delay time periods are variable in length depending on operation of the vehicle. An indicator is coupled to the timer for providing an operator indication, based on the activation signal, indicating that the turn signal in the vehicle is activated.

29 Claims, 3 Drawing Sheets

TURN SIGNAL MONITOR CIRCUIT

BACKGROUND OF THE INVENTION

The present invention deals with a turn signal in a vehicle. More particularly, the present invention deals with a monitor circuit for monitoring a turn signal in a vehicle.

Turn signals are commonly found on many different types of vehicles. For example, turn signals are found on motorcycles and in automobiles. Typical turn signals are activated when an operator wishes to signal a turn and manually throws a switch to activate a turn signal indicator. The switch closes a circuit to supply power to a flasher. The flasher has an internal bi-metallic contact which heats up when power is supplied to it. As the bi-metallic contact heats, it deforms or bends due to a difference in the coefficient of linear expansion in the two bi-metallic components of the flasher. As the bi-metallic contact bends, it opens a circuit which supplies power to a turn signal lamp mounted on the vehicle. When the circuit is broken, the lamp is extinguished.

When the bi-metallic contact bends and breaks the circuit, current is no longer flowing through the contact. Therefore, it begins to cool. As the bi-metallic contact cools, it resumes its original position closing the circuit to the turn signal lamp. This reestablishes the application of power to the turn signal lamp and the turn signal lamp is again illuminated. This cycle repeats itself causing the turn signal lamp to blink as is commonly known.

The turn signal which was initiated by the operator can be turned off either manually or automatically. The turn signal is turned off manually when the operator replaces the turn signal switch to its neutral position. The turn signal is turned off automatically, in an automobile, when the steering wheel is rotated a certain number of degrees and then rotated back to its nominal position.

However, certain undesirable conditions, and potentially hazardous conditions, result from the typical operation of a turn signal. For instance, during both city and freeway driving, vehicle operators are required by law in many states to signal lane changes using the vehicle's turn signal. The relative lateral movement of the vehicle to make a lane changer however, does not require the operator to rotate the steering wheel the minimum number of degrees to deactivate the turn signal. Therefore, the turn signal is not automatically turned off. Further, the operator may not notice that the turn signal is still activated. This gives other drivers on the freeway the false indication that the vehicle operator is signaling a lane change or a turn when, in fact, the operator does not intend to make such a change. This can potentially be hazardous.

The turn signal can also remain activated, without the operator's knowledge, under other circumstances. For instance, where a signaled turn is not a lane change, but rather a gradual turn which is commonly made to enter a freeway by an on ramp or to exit a freeway through an off ramp, such a turn often does not automatically disengage the turn signal. This can result in the turn signal remaining active without the operator knowing that it is active. Similarly, where a road branches and the operator signals to indicate that the vehicle will be taking either the right or left branch, the turn can be so gradual that it does not require the necessary steering wheel rotation to disengage the turn signal.

In all of these instances, an undesirable, and possibly hazardous, condition results. The turn signal on the vehicle is active, thus signaling to other vehicles an intended turn, when in reality the operator of the vehicle does not intend to make such a turn.

There have been several attempts to deal with the present problem. In one attempt, an alarm is provided to the operator when the turn signal is activated. The alarm simply continues until the turn signal is deactivated, either manually or automatically. However, this type of system presents certain problems. For example, the operator can very typically wait in line in a turn lane at a controlled intersection where the vehicles turn signal must remain on for (perhaps in heavy traffic) several minutes. In that instance, the alarm is provided continuously for the entire duration that the turn signal is on, until the operator reaches the intersection and actually makes the desired turn. This continuous alarm can become very annoying to the operator.

A similar disadvantage manifests itself during city driving, where there are many stoplights. An operator may spend a good portion of time at stoplights with a turn signal activated. Each time the turn signal is activated, the alarm is continuously presented to the operator. Such annoyances can not only be irritating to the driver, but can be distracting in the operation of the vehicle. The operator may simply tend not to signal every turn to avoid initiation of the alarm. This can be hazardous.

There have also been other attempts to deal with the problem of having the turn signal remain activated without the operator's knowledge. Such attempts have included automatic deactivation or termination of the turn signal after a predetermined time period. Also, prior systems have cancelled the turn signal when the speed of the vehicle has exceeded a predetermined threshold. Both of these prior attempts to solve the present problem are flawed from a safety standpoint. Both of these systems automatically disable the turn signal. They take the operator out of the loop so that it is no longer the operator's decision to deactivate the turn signal. Rather, the turn signal is deactivated automatically. Such a situation can result in the turn signal being terminated when the operator does not desire termination of the turn signal. This can result in the vehicle changing lanes without signaling, or making an unsignaled turn at an intersection. Such acts are as hazardous, if not more so, than having the vehicle signaling a turn when no turn is intended by the operator.

SUMMARY OF THE INVENTION

The present invention arises from the recognition that it is desirable to leave the control of the turn signal within the discretion of the operator. An indicating circuit provides an indication that a turn signal in a vehicle is activated. Timer means receive an activation signal representative of the turn signal. The timer means provides a reminder output signal based on the activation signal. The timer means provides the reminder output signal during reminder periods which are spaced by delay time periods. The delay time periods are variable in length depending on operation of the vehicle. Indication means are coupled to the timer means for providing an operator indication, based on the activation signal, that the turn signal in the vehicle is activated.

One embodiment of the present invention also recognizes that two time periods are desirable before sounding the alarm. For instance, in highway driving, the turn signal will be used primarily for lane changes and exit ramps. Therefore, a longer interval may be desired before the audible reminder is provided. However, in city driving, more rapid decisions and maneuvers are made by the operator. Thus, a shorter interval may be desired. Therefore, in one embodiment, the interval after which the audible reminder is repeated tends to be shorter during city driving and longer during freeway driving.

In another embodiment, the present invention includes a turn signal monitor circuit for monitoring a turn signal in a vehicle having a brake. A first timer receives the turn signal and provides an output signal based on the turn signal. An audible reminder circuit is coupled to the first timer for providing an audible reminder in response to the output signal. The first timer delays the output signal for a delay time period and restarts the delay time period after activation and release of the brake. Thus, release of the brake delays the audible reminder for another complete delay time period. Continual engagement of the brake continually resets, and therefore effectively inhibits, the delay time period to continually inhibit the audible reminder.

In another embodiment, the present invention is also coupled to a hazard light switch. Activation of the hazard lights continually delays output of the audible reminder. This allows the hazard lights to be activated for an indefinite period of time without providing any type of continuous audible reminder.

DETAILED DESCRIPTION OF THE PREFERRED EMBODIMENTS

Figure 1:
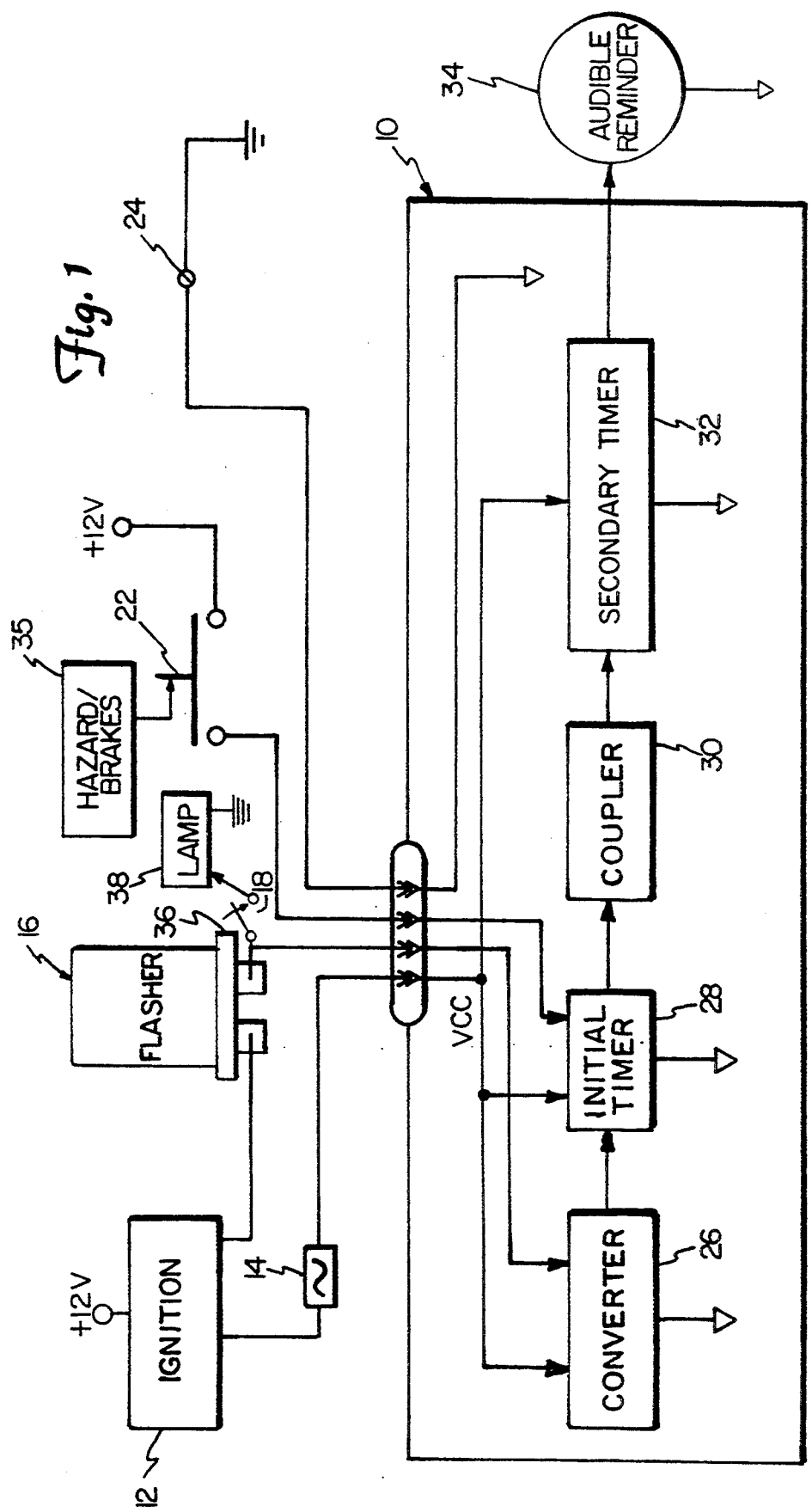
FIG. 1 is a block diagram of the turn signal monitor of the present invention.

FIG. 1 is a block diagram of turn signal monitor circuit 10 (monitor circuit 10) coupled to various items on a vehicle. Monitor circuit 10 is coupled to ignition system 12 by fuse 14, and through flasher 16, and coupled to turn signal lamp 38 through turn signal switch 18. Monitor circuit 10 is further coupled to hazard and brake switch 22, and to chassis ground 24.

Monitor circuit 10 includes converter 26, initial timer 28, coupler 30, and secondary timer 32. Monitor circuit 10 has an output which is coupled to audible reminder circuit 34.

In operation, ignition of the vehicle causes ignition system 12 to apply a voltage potential to provide power to monitor circuit 10 through fuse 14 and to provide a voltage potential to flasher 16. In the preferred embodiment, the voltage potential is +12 V. If the operator of the vehicle desires to signal a turn, the operator closes turn signal switch 18 in a known manner. Closing switch 18 completes a circuit path through flasher 16 and lamp 38.

Flasher 16 is a known type of flasher which includes a bi-metallic, normally closed, contact 36 coupled to turn signal lamp 38. As soon as power is applied to the bi-metallic metallic contact 36 of flasher 16, the bi-metallic contact 36 begins to conduct current thereby causing lamp 38 to illuminate. As current is conducted through bi-metallic contact 36, the bi-metallic contact begins to heat. Due to differences in the coefficient of linear expansion in the two metallic components of bi-metallic contact 36, bi-metallic contact 36 begins to bend as it heats. When bi-metallic contact 36 heats to a sufficient point, the bending of the contact actually opens the circuit through flasher 16 so that contact 36 no longer conducts current. This causes lamp 38 to extinguish.

Since bi-metallic contact 36 is no longer conducting current, it begins to cool and straighten. As soon as bi-metallic contact 36 cools sufficiently, it again makes contact, conducts current, and causes lamp 38 to again be illuminated. This cycle repeats itself so that lamp 38 blinks in a known fashion.

While bi-metallic contact 36 is making and breaking contact, a resultant pulsating signal is provided to converter 26 in monitor circuit 10. Converter 26 converts the pulsating signal into a substantially steady state signal and provides the substantially steady state signal to initial timer 28. Upon receipt of the steady state signal from converter 26, initial timer 28 begins to time a delay time period. After the delay time period has elapsed, initial timer 28 provides a reminder output signal to coupler 30 which provides the reminder output signal to secondary timer 32. Upon receiving the reminder output signal, secondary timer 32 provides a driver signal to audible reminder circuit 34. In response to the driver signal, audible reminder circuit 34 provides an audible reminder tone to the operator in the vehicle.

After providing the initial driver signal to audible reminder circuit 34, secondary timer 32 begins to time an intermittent time period. As soon as the intermittent time period has elapsed, secondary timer 32 again provides a driver signal to audible reminder circuit 34 which, in turn, provides another audible reminder to the operator of the vehicle. Secondary timer 32 continually provides these intermittent driver signals to audible reminder circuit 34, separated by intermittent time periods, as long as secondary timer 32 is receiving the reminder output signal from initial timer 28 via coupler 30.

Therefore, after an operator activates the turn signal 18, and assuming the operator takes no other action, then after an initial delay time period set by initial timer 28, the operator hears an audible reminder tone that the turn signal is still activated. The audible reminder tone is repeated after every intermittent time period set by secondary timer 32 until the turn signal is either deactivated, or until the operator takes some other action to eliminate or delay the audible reminder tone.

The operator can take several actions which eliminate or delay the audible reminder tone. First, the operator can manually deactivate (or open) turn signal 18. This eliminates the steady state signal provided to initial timer 28 from converter 26. Thus, initial timer 28 does not provide a reminder output signal to secondary timer 32. The driver can also (assuming the vehicle is an automobile) rotate the steering wheel the required number of degrees to automatically deactivate (or open) turn signal switch 18. This has the same effect as manual deactivation of switch 18. Both deactivations of switch 18 prevent reminder circuit 34 from providing the reminder tone.

In addition, the operator can delay or inhibit the audible reminder tone simply by activating the brake in the vehicle or by turning on the hazard lights. Hazard and brake switch 22 is configured to close when either the hazard lights are turned on, or when the brake in the vehicle is activated. The brakes and hazard lights are represented by block 35.. When switch 22 closes, a signal is provided to initial timer 28 of monitor circuit 10. The signal causes initial timer 28 to continually reset (or restart) the delay time period during the entire time that switch 22 is closed. When the brake is deactivated, or the hazard lights are turned off, switch 22 opens and the delay time period again begins to run.

Keeping in mind that initial timer 28 does not provide the reminder output signal until after the delay time period has elapsed, each time the operator activates the brake, initial timer 28 will continually reset the delay time period effectively inhibiting the reminder output signal until the brake is released. After the brake is released, initial timer 28 waits another entire delay time period until it provides the reminder output signal. If the operator activates the hazard lights, or activates the brake and keeps the brake activated, switch 22 remains closed and initial timer 28 continually resets the delay time period. Thus, initial timer 28 is continually prevented from providing the reminder output signal to secondary timer 32.

Since secondary timer 32 requires the presence of the reminder output signal in order to drive audible reminder circuit 34, the operator delays the audible reminder tone each time the operator activates the brake. Thus, monitor circuit 10 eliminates the disadvantages associated with prior attempts to remedy the present problem. For instance, if the operator of the vehicle is at a stop light with turn signal switch 18 activated, the operator will typically have the brake pedal (or brake handle in the case of a motorcycle) depressed in order to keep the vehicle at a stop. While the brake pedal is depressed, monitor circuit 10 does not provide an audible reminder tone. This eliminates the irritation and annoyance, as well as the distraction, provided by some prior art circuits. In addition, monitor circuit 10 does not deactivate switch 18 automatically. Therefore, monitor circuit 10 leaves the decision of whether to deactivate switch 18 entirely with the operator of the vehicle.

Figure 2:
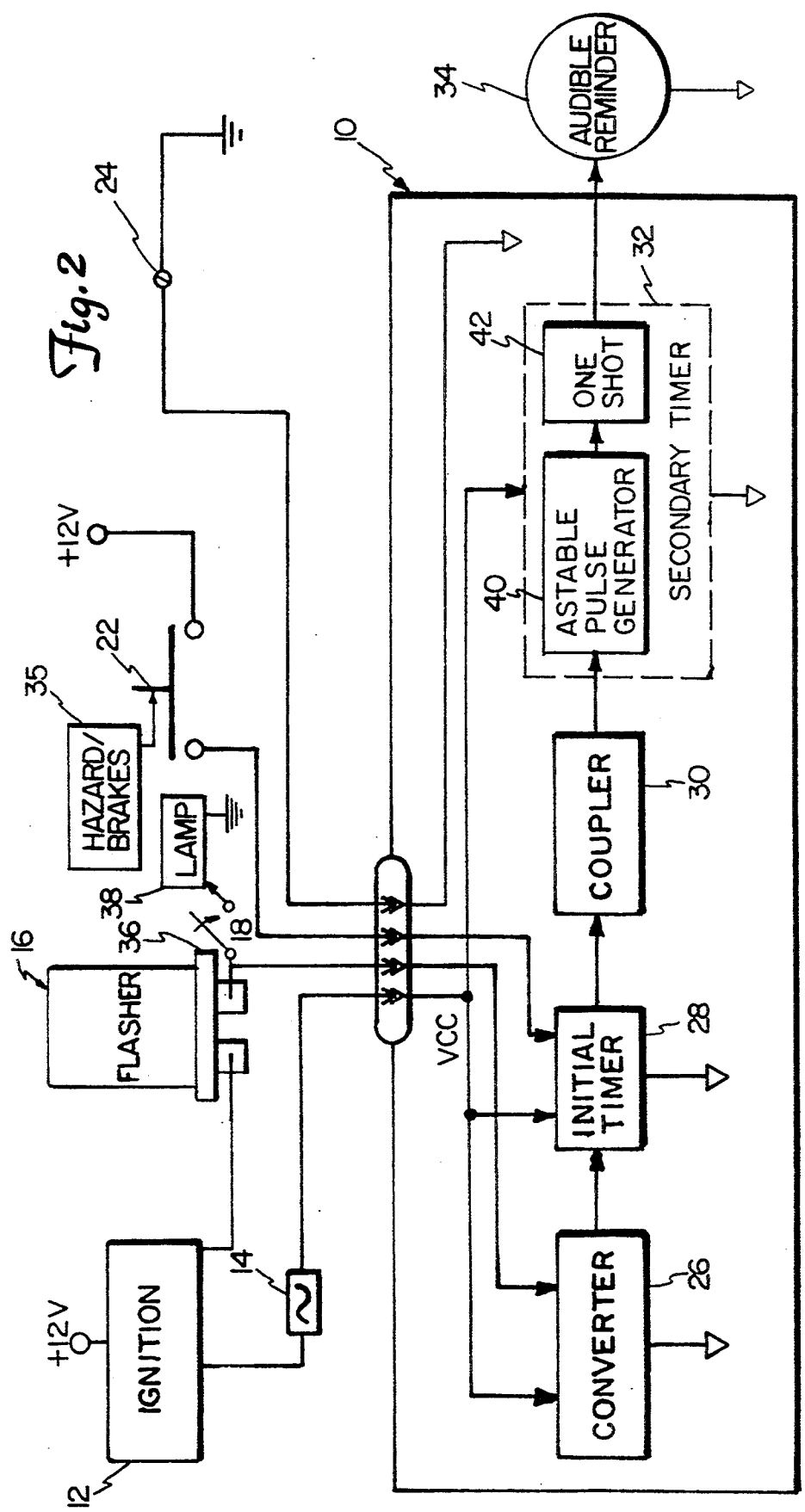
FIG. 2 is a more detailed block diagram of the turn signal monitor shown in FIG. 1.

FIG. 2 is a more detailed block diagram of monitor circuit 10 with secondary timer 32 shown in greater detail. Similar items shown in FIGS. 1 and 2 are correspondingly numbered. Secondary timer 32 includes a stable pulse generator 40 and one shot 42. A stable pulse generator 40 receives the reminder output signal from initial timer 28 via coupler 30. Upon receipt of the reminder output signal, a stable pulse generator 40 provides a pulse to one shot 42. As long as the reminder output signal is provided to a stable pulse generator 40, a stable pulse generator 40 will provide a pulse to one shot 42 after each intermittent time period. The length of each intermittent time period can be adjusted by varying bias circuitry provided to a stable pulse generator 40. This will be described in more detail with respect to FIG. 3.

Upon receiving a pulse from a stable pulse generator 40, one shot 42 provides the driver Signal to audible reminder circuit 34. The driver signal has a duration which is adjustable by adjusting bias Circuitry to one shot 42. This will also be described with respect to FIG. 3. Thus, the pulses provided by a stable pulse generator 40 in response to the reminder output signal from initial timer 28 serve to trigger and reset one shot 42 to provide the intermittent driver signal, for a desired period separated by desired pauses, to audible reminder circuit 34.

Figure 3:
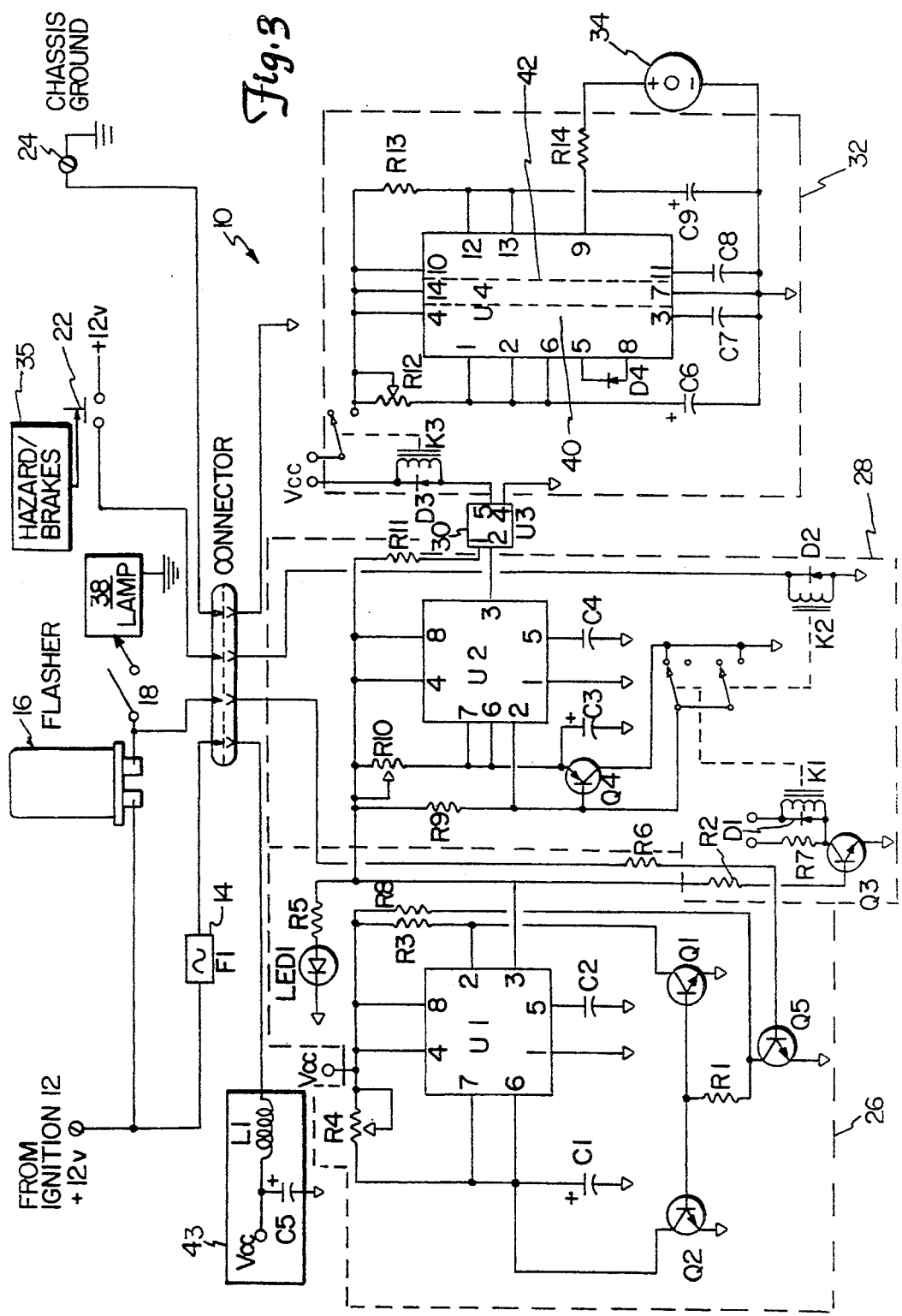
FIG. 3 is a circuit diagram of the turn signal monitor shown in FIGS. 1 and 2.

FIG. 3 is a circuit diagram of monitor circuit 10. Monitor circuit 10 includes power supply circuit 43 which includes capacitor C5 and inductor L1. Power supply circuit 43 receives power, through fuse 14, when ignition system 12 is activated. Power supply circuit 43 provides supply voltage VCC (which in the preferred embodiment is +12 V) to other circuit components in monitor circuit 10.

Converter 26 includes integrated circuit chip U1, transistors Q1, Q2, and Q5, resistors R1, R3, R5, R6, and R8, capacitors C1 and C2, light emitting diode LED1 and potentiometer R4.

Initial timer 28 includes integrated circuit U2, resistors R2, R7, R9, and R11, transistors Q3 and Q4, potentiometer R10, switches K1 and K2, and capacitors C3 and C4.

Coupler 30 includes integrated circuit chip U3.

Secondary timer 32 includes switch K3, potentiometer R12, integrated circuit chip U4, resistors R13 and R14, diode D4, and capacitors C6, C7, C8, and C9.

In the preferred embodiment, integrated circuit chips U1 and U2 are standard 555 timer chips. Integrated circuit chip U3 is a TIL 119 opto-coupler chip manufactured by Motorola. Integrated circuit chip U4 is a dual timer SE or NE 556 circuit chip. All of these circuit chips are commercially available. The pin designations shown on integrated circuit chips U1–U4 correspond to integrated circuit chips of the preferred embodiment.

In operation, power supply circuit 43 is coupled on the ignition side of a battery in the vehicle as is flasher 16. Thus, when the ignition is turned on, power supply circuit 43 generates voltage VCC which is applied to integrated circuit chip U1 and to flasher 16. With the turn signal in the off position, switch 18 is open and a positive potential due to normally closed contact flasher 16, is present across current limiting resistor R6 which is coupled to the base of transistor Q5. Therefore, transistor Q5 is forward biased and conducts current. Current flows through transistor Q5 causing a low potential to occur at its collector, and correspondingly at resistor R1. Low potential across resistor R1 causes transistors Q1 and Q2 to be reverse biased and, consequently, non-conductive. Therefore, with no turn signal present, transistors Q1 and Q2 remain off.

Integrated circuit chip U1 is configured as a retriggerable monostable multivibrator. Pull-up resistor R3, connected to integrated circuit U1 and to the collector of transistor Q1, causes a positive potential to occur at the trigger input of integrated circuit chip U1 (pin 2). Integrated circuit chip U1 is configured so that a negative going trigger pulse is required at the trigger input of integrated circuit chip U1 to change the output state of integrated circuit chip U1. Therefore, with the trigger input of U1 at a high voltage potential, chip U1 remains in its quiescent state.

Transistor Q2 is used as an additional discharge mechanism for capacitor C1 and, like transistor Q1, remains non-conducting (off) until a trigger pulse is received at the trigger input of integrated circuit U1. In this state, integrated circuit chips U2, U3, and U4, and the other discrete components in monitor circuit 10 remain dormant.

When the operator uses either the right or left turn signal indicator the operator closes switch 18 and monitor circuit 10 goes into an active state. For the present example, assume the operator has turned on the left turning signal. This closes switch 18. Closure of switch 18 completes the electrical circuit through flasher 16 causing current to flow through bi-metallic contact 36. The current flow causes lamp 38 to be illuminated. When the bi-metallic contact heats and opens, the circuit to lamp 38 is broken and the lamp extinguishes. When the bi-metallic contact 36 cools and again makes contact, the circuit path to the lamp is re-established and lamp 38 is again illuminated. This cycle repeats itself giving the vehicle the blinking turn indicator commonly known.

When the turn signal is off, the potential applied to the base of transistor Q5 is high causing transistor Q5 to conduct. In addition, when switch 18 is closed and the circuit to flasher 16 is initially completed, the potential across resistor R6, due to the nature of flasher 16, is still high and transistor Q5 still conducts. However, as bi-metallic contact 36 heats up and opens, again due to the nature of flasher 16, the voltage potential across resistor R6, and applied to the base of transistor Q5 either floats or goes low. This causes transistor Q5 to switch off.

With transistor Q5 switched off, pull-up resistor R8 causes a positive voltage potential to be applied to the bases of transistors Q1 and Q2. This positive voltage potential causes transistors Q1 and Q2 to become forward biased and to conduct. Conduction of transistors Q1 and Q2 causes a low signal to be applied to pins 2 and 6 of integrated circuit U1. The low signal at pin 2 acts as a trigger to integrated circuit U1. The low signal at pin 6 effectively dumps the charge previously accumulated on capacitor C1. The output of integrated circuit U1 (pin 3) goes high in response to the input trigger at input pins 2 and 6. When the output of integrated circuit U1 goes high, integrated circuit U1 effectively becomes the power source for integrated circuits U2 and U3, and other discrete components in monitor circuit 10.

As transistor Q2 conducts, the charge on capacitor C1 is dumped to ground.

When contact 36 in flasher 16 cools, flasher 16 illuminates turn signal lamp 38 for another brief period. When flasher 16 completes the circuit to turn signal lamp 38, the high voltage potential is again applied to the base of transistor Q5 through current limiting resistor R6. Transistor Q5 switches on, effectively turning off transistors Q1 and Q2. This causes a high voltage potential to be applied to pins 2 and 6 of integrated circuit U1, and to one side of capacitor C1. Thus, capacitor C1 begins to charge through potentiometer R4 according to a preset time constant until it reaches a value of approximately ⅔ VCC.

Then, flasher 16 again opens the path to turn signal lamp 38. This causes a low voltage potential to be applied across resistor R6 to the base of transistor Q5 thus turning off transistor Q5. Transistors Q1 and Q2 are again forward biased and switch on producing a low signal at pins 2 and 6 of integrated circuit U1, and to capacitor C1. When the low signal arrives at pin 2 of integrated circuit U1, it acts as another trigger pulse to integrated circuit U1. When the low signal arrives at pin 6, it cancels the charge building in capacitor C1. Since capacitor C1 has not reached ⅔ VCC (because the time constant set through potentiometer R4 is longer than the cycling rate of flasher 16), and since integrated circuit U1 has been triggered again, the timing cycle to charge capacitor C1 starts over. Thus, the output of integrated circuit U1 (pin 3) is maintained (at substantially a steady state high level) even though the input from flasher 16 is pulsed.

LED1 cooperates with resistor R5 so that LED1 is illuminated when the output signal from integrated circuit U1 is high. Since cycling rates in different vehicle turn signal units can differ, LED1 is used to calibrate the present circuit to a particular vehicle. After installation of the present circuit, the operator calibrates the circuit by turning on the left or right turn signal and adjusting potentiometer R4 while observing LED1, until LED1 is continuously illuminated. If potentiometer R4 is incorrectly set, LED1 pulses on and off with the signal from flasher 16.

The instant the power is supplied to integrated circuit U2, by the output of integrated circuit U1, the base emitter junction of transistor Q4 is forward biased and transistor Q4 conducts. With transistor Q4 conducting, charge previously stored on capacitor C3 is dumped to ground. This provides a low input on pin 2 of integrated circuit U2 which sets the output of integrated circuit U2 (pin 3) to a high level.

Also, when the output of integrated circuit U1 goes high, a high voltage potential is provided through resistor R2 to the base of transistor Q3 which causes transistor Q3 to become forward biased and to conduct. This pulls the collector of transistor Q3 to a low voltage potential. The collector is usually at a high voltage potential through pull-up resistor R7. However, when transistor Q3 conducts relay K1 is energized., Diode D1 (and diodes D2, D3) are in place across the windings of relay K1 (and relays K2, and K3) to suppress an inductive spike present when the relay is switched off. This spike is the result of the collapsing electromagnetic field built up when the relay energizes and is then de-energized. The spike from the relay shut off (current break) will have a high voltage and polarity opposite of Vcc. Thus, diode D1 (and diodes D2, and D3) is placed in shunt with the relay coil in reverse biased condition. The high voltage transient (spike) is clipped to 0.7 volts preventing damage to the associated driver transistors.

Once relay K1 is energized, then due to the mechanical delay of relay K1, the conduction of transistor Q4 will already have dumped the charge on capacitor C3 to ground by the time the normally closed contacts of relay K1 open. Once the contacts of relay K1 open, that opens the circuit across the base emitter junction of transistor Q4 thereby turning off transistor Q4. This allows capacitor C3 to begin charging through potentiometer R10. Thus, the time constant developed through potentiometer R10 and capacitor C3 sets a time delay in the output of initial timer 28. This delay is preferrably eight seconds, but can be any suitable interval.

The charging time on capacitor C3 can also be interrupted. If the operator depresses the brake pedal, switch 22 closes energizing relay K2. When relay K2 is energized, its normally open set of contacts closes again causing transistor Q4 to conduct, so long as the output of integrated circuit U1 is still high. When transistor Q4 begins conducting, it again dumps the charge accumulated on capacitor C3 to ground, again resetting integrated circuit U2. Once the operator releases the brake pedal, switch 22 opens, relay K2 is de-energized and its contacts open, turning off transistor Q4, and allowing capacitor C3 to begin charging. So long as the operator has the brake pedal depressed, switch 22 is closed, transistor Q4 conducts and capacitor C3 does not charge.

Assuming the output of integrated circuit U1 is still high, and assuming that the charging time of capacitor C3 has not recently been interrupted, the charge on capacitor C3 eventually raises the input at pin 2 of integrated circuit U2 and thereby changes the output at pin 3 of integrated circuit U2 to a low level. In this embodiment, the output of integrated circuit U2 is active low.

Coupler 30 includes integrated circuit U3. In this preferred embodiment, integrated circuit U3 is an optical coupler for coupling the output of integrated circuit U2 (pin 3) to relay K3. As the output of integrated circuit U2 goes low, optical coupler U3 couples the low level to energize relay K3. When relay K3 is energized, its contacts close to provide VCC to integrated circuit U4.

In this preferred embodiment, integrated circuit U4 includes two timer circuits in a single integrated circuit package. One portion of integrated circuit U4 operates as astable oscillator (or pulse generator) 40 operating at approximately eight second intervals. The other portion of integrated circuit U4 operates as monostable multivibrator or one shot 42.

When power is applied to integrated circuit U4 via relay K3, both portions 40 and 42 of integrated circuit U4 have high outputs. The one shot 42 portion of integrated circuit U4 has an output (pin 9) which immediately goes high for approximately one second. This provides a high voltage potential through resistor R14 to audible reminder circuit 34. In this preferred embodiment, audible reminder circuit 34 is a piezoelectric alarm which sounds each time it receives a high driver signal through resistor R14. The time that the output of one shot 42 is high (in this preferred embodiment one second) is set by a time constant determined by resistor R13 and capacitor C9. Thus, once switch 18 is closed, assuming the brake or hazards are not activated, the audible reminder 34 will sound for one second, eight seconds after switch 18 is closed. If the brake is activated and released, audible reminder 34 will sound for one second, eight seconds after the brake is released.

The astable pulse generator 40 portion of integrated circuit U4 provides a high output (pin 5) for approximately fourteen seconds. This high output resets the one shot of integrated circuit U4 causing the output at pin 9 to go low. This turns off the audible reminder circuit 34.

Capacitor C6 and potentiometer R12 set the cycle time for the astable pulse generator 40 portion of integrated circuit U4 to the fourteen second interval. Any suitable interval can be chosen.

When the fourteen second interval elapses, the output of the astable pulse generator (pin 5) goes low which causes the input of the one shot (pin 8) to be triggered. When triggered (at pin 8), the output of one shot 42 (pin 9) again goes high for approximately one second sounding the audible piezoelectric alarm in circuit 34.

Integrated circuit U4 continues to sound the alarm in circuit 34 for one second every fourteen seconds until the operator returns the turn signal lever to the off position (opening switch 18), until the turn signal lever is automatically returned to its nominal position (opening switch 18), until the operator turns on the hazard lights (closing switch 22), or until the operator activates and releases the brake (closing switch 22). In each of these cases, the charging period of capacitor C3 in initial timer 28 is reset causing the output of integrated circuit U2 to go high, thereby de-energizing relay K3 and removing power from integrated circuit U4.

In conclusion, the present invention provides a turn signal monitor circuit 10. The monitor circuit 10 monitors the turn signal and sounds an audible reminder tone after the signal has been on for a predetermined, yet variable, amount of time. The audible reminder tone is delayed for a certain delay time period, in this preferred embodiment eight second, which is reset each time the operator depresses and releases the brake in the vehicle. Further, the audible reminder tone is entirely inhibited when the operator turns on the hazard lights or keeps the brake depressed. Finally, the reminder tone is provided intermittently, in this preferred embodiment, once every fourteen seconds. The length of the reminder tone, as well as the length of time between reminder tones and the length of the delay time period can easily be changed as desired.

Thus, the present invention alerts the operator of the vehicle that the turn signal is still activated, only when necessary. During freeway driving, when maneuvers do not occur as often, the operator will receive a reminder tone eight seconds after the turn signal is activated, and every fourteen seconds thereafter (assuming the brake is not activated). During city or residential driving, when the brake is depressed often, the operator receives a reminder tone eight seconds after the turn signal is activated and eight seconds after each release of the brake (assuming there are no intervening brake activations). This has the effect of providing quicker reminder tones in city driving and tones spaced further apart during freeway driving. It also completely inhibits the tone when the operator is sitting at a turn signal with the brake depressed. This avoids annoyances and distractions associated with prior turn signal circuits which continually sounded an alarm. In addition, the present invention leaves the choice of whether to deactivate the turn signal entirely with the vehicle operator. This also avoids potential hazardous conditions which can arise with prior turn signal circuits.

Although the present invention has been described with reference to preferred embodiments, workers skilled in the art will recognize that changes may be made in form and detail without departing from the spirit and scope of the invention.

What is claimed is:

1. A non-obtrusive turn signal monitor and reminder circuit for monitoring a turn signal in a vehicle and reminding an operator after a set time period, the turn signal monitor and reminder circuit comprising:

a turn signal circuit activated to provide a pulsating signal;

a converter coupled to the turn signal circuit for converting the pulsating signal into a direct current output signal while the turn signal is activated;

a first timer coupled to the converter for providing a first timer output signal wherein the first timer is powered by the converter output signal, the first timer comprising:

first adjustable delay means for providing a delay time period before providing the first timer output signal; and resetting means for suspending the first adjustable delay means upon the occurrence of a specified event;

a second timer directly coupled to the first timer for providing an intermittent alarm driver signal in response to the first timer output signal, the intermittent driver signal having an on time and an off time independent of the frequency of the turn signal circuit pulsating signal, the second timer comprising:

a first timing portion for adjustably setting the off time period of the alarm driver signal; and a second timing portion for setting the duration of the on time of the alarm driver signal; and an audible alarm coupled to the second timer for providing an audible tone in response to the on time of the alarm driver signal.

2. The turn signal monitor and reminder circuit of claim 1 wherein the converter includes a post-installation, operator controlled calibration system for calibrating the turn signal circuit.

3. The turn signal monitor and reminder circuit of claim 2 wherein the calibration system comprises an operator visible light-emitting diode and operator accessible adjustment knob.

4. The turn signal monitor and reminder circuit of claim 1 further comprising optical coupling means for directly coupling the first timer to the second timer.

5. The turn signal monitor and reminder circuit of claim 1 wherein the first adjustable delay means comprises a potentiometer coupled to a capacitor.

6. The turn signal monitor and reminder circuit of claim 1 wherein the first adjustable delay time period is approximately 8 seconds.

7. The turn signal monitor and reminder circuit of claim 1 wherein the vehicle has a brake and a brake circuit that operates a brake light in response to activation of the brake and wherein the resetting means of the first timer is coupled to the brake circuit and wherein the specified event of the resetting means is the activation of the brake, the first adjustable delay means being restarted upon deactivation of the brake.

8. The turn signal monitor and reminder circuit of claim 1 wherein the first timing portion includes a potentiometer coupled to a capacitor.

9. The turn signal monitor and reminder circuit of claim 1 wherein the off time of the intermittent alarm driver signal is approximately 14 seconds.

10. The turn signal monitor and reminder circuit of claim 1 wherein the second timing portion includes a resistor and capacitor network.

11. The turn signal monitor anal reminder circuit of claim 1 wherein the on time of the intermittent alarm driver signal is approximately 1 second.

12. The turn signal monitor and reminder circuit of claim 1 wherein the first timing portion of the second timer is an astable oscillator and the second timing portion of the second timer is a monostable multivibrator.

13. The turn signal monitor and reminder circuit of claim 1 wherein the off time is substantially longer than the on time.

14. The turn signal monitor and reminder circuit of claim 1 wherein the off time is approximately 14 times greater than the on time.

15. A non-obtrusive turn signal monitor and reminder circuit for monitoring a turn signal in a vehicle and reminding an operator after a set time period, the turn signal monitor and reminder circuit comprising:

a turn signal circuit activated to provide a pulsating signal;

a converter coupled to the turn signal circuit for converting the pulsating signal into a direct current output signal while the turn signal is activated, wherein the converter has a post-installation, operator controlled calibration circuit to calibrate the turn signal and reminder circuit;

a first timer for providing a first timer output signal wherein the first timer is coupled to the converter and wherein the first timer is powered by the converter output signal, the first timer comprising:

a first adjustable delay circuit for providing a delay time period before providing the timer output signal; and a reset circuit for suspending the first adjustable delay circuit upon the occurrence of a specified event;

a second timer directly coupled to the first timer for providing an intermittent alarm driver signal in response to the first timer output signal, the intermittent driver signal having an on time and an off time independent of the frequency of the turn signal circuit pulsating signal, the second timer comprising:

a first timing portion for adjustably setting the off time period of the alarm driver signal; and a second timing portion for setting the duration of the on time of the alarm driver signal; and an audible alarm coupled to the second timer for providing an audible tone in response to the on time of the alarm driver signal.

16. The turn signal monitor and reminder circuit of claim 15 wherein the calibration circuit comprises a light emitting diode and a potentiometer.

17. The turn signal monitor and reminder circuit of claim 15 further comprising an optical coupler for directly coupling the first timer to the second timer.

18. The turn signal monitor and reminder circuit of claim 15 wherein the first adjustable delay circuit comprises a potentiometer coupled to a capacitor.

19. The turn signal monitor and reminder circuit of claim 15 wherein the first adjustable delay time period is approximately 8 seconds.

20. The turn signal monitor and reminder circuit of claim 15 wherein the vehicle has a brake and a brake circuit that operates a brake light in response to activation of the brake and wherein the resetting circuit of the first timer is coupled to the brake circuit and wherein the specified event of the resetting circuit is the activation of the brake, the first adjustable delay circuit being restarted upon deactivation of the brake.

21. The turn signal monitor and reminder circuit of claim 15 wherein the first timing portion includes a potentiometer coupled to a capacitor.

22. The turn signal monitor and reminder circuit of claim 15 wherein the off time of the intermittent alarm driver signal is approximately 14 seconds.

23. The turn signal monitor and reminder circuit of claim 15 wherein the second timing portion includes a resistor and capacitor.

24. The turn signal monitor and reminder circuit of claim 15 wherein the on time of the intermittent alarm driver signal is approximately 1 second.

25. The turn signal monitor and reminder circuit of claim 15 wherein the first timing portion of the second timer is an astable oscillator and the second timing portion of the second timer is a monostable multivibrator.

26. The turn signal monitor and reminder circuit of claim 15 wherein the off time is substantially longer than the on time.

27. The turn signal monitor and reminder circuit of claim 15 wherein the off time is approximately 14 times greater than the on time.

28. A method of monitoring a turn signal in a vehicle and audibly reminding an operator after a set period of time the method comprising:

(a) providing a turn signal monitoring circuit comprising:
  a turn signal circuit activated to provide a pulsating signal;
  a converter coupled to the turn signal circuit wherein the converter has a post-installation, operator controlled calibration circuit having a light-emitting diode and an operator accessible potentiometer;
  a first timer coupled to the converter for providing a first timer output signal, the first timer having a first adjustable delay circuit for setting a first adjustable delay time period and a resetting circuit;
  a second timer directly coupled to the first timer for providing an intermittent alarm driver signal, the second timer having a first timing portion for setting an off time period of the alarm driver signal and a seconal timing portion for setting an alarm duration on time period;
  an audible alarm coupled to the second timer;
(b) providing a pulsating signal from the turn signal circuit while the turn signal is activated;
(c) converting the pulsating signal into a direct current output signal;
(d) coupling the converter output signal to the first timer means;
(e) powering the first timer with the converter output signal;
(f) waiting for the completion of the first adjustable delay time period;
(g) resetting the first adjustable delay time period upon the occurrence of a specified event;
(h) outputting the first timer output signal at the completion of the first adjustable delay time period;
(i) directly coupling the first timer output signal to the second timer;
(j) sounding the audible alarm for the alarm duration on time period in response to the first timer output signal;
(k) disabling the audible alarm at the end of the alarm duration on time;
(l) waiting for the completion of the first timing portion off time period which is substantially longer than the on time period;
(m) sounding the audible alarm for the alarm duration on time period upon the completion of the first timing portion off time period; and
(n) repeating the steps (k)–(n) until the turn signal circuit is deactivated.

29. The method of claim 28 wherein the vehicle has a brake and a brake circuit that operates a brake light in response to activation of the brake and wherein the resetting circuit of the first timer is coupled to the brake circuit and wherein the specified event is the activation of the brake.

* * * * *